United States Patent [19]

Paterson et al.

[11] Patent Number: 4,980,684

[45] Date of Patent: Dec. 25, 1990

[54] WARNING SYSTEM FOR TACTICAL ROTARY WING AIRCRAFT

[75] Inventors: Noel S. Paterson, Bothell; John H. Glover, Kirkland, both of Wash.

[73] Assignee: Sundstrand Data Controls, Inc., Redmond, Wash.

[21] Appl. No.: 629,607

[22] Filed: Jul. 11, 1984

Related U.S. Application Data

[63] Continuation-in-part of Ser. No. 503,216, Jun. 10, 1983, abandoned.

[51] Int. Cl.$^5$ ............................................. G08B 21/00
[52] U.S. Cl. .................................. 340/970; 73/178 H; 244/17.11; 340/946; 340/963; 342/65; 364/433
[58] Field of Search ............... 340/960, 963, 969, 970, 340/946, 977; 364/427, 428, 433; 343/7 TA; 73/178 R, 178 H, 178 T; 244/17.11, 180, 182; 89/1.55; 102/206; 342/65

[56] References Cited

U.S. PATENT DOCUMENTS

| | | | |
|---|---|---|---|
| 3,681,580 | 8/1972 | Gwathmey et al. | 364/434 |
| 3,715,718 | 2/1973 | Astengo | 340/970 |
| 3,916,688 | 11/1975 | Dendy et al. | 73/178 T |
| 3,934,221 | 1/1976 | Bateman et al. | 340/970 |
| 3,934,222 | 1/1976 | Bateman et al. | 340/970 |
| 3,944,968 | 3/1976 | Bateman et al. | 340/970 |
| 3,946,358 | 3/1976 | Bateman | 340/970 |
| 3,979,717 | 9/1976 | Barnum et al. | 364/428 |
| 4,030,065 | 6/1977 | Bateman | 364/428 |
| 4,293,840 | 10/1981 | Hadari | 364/433 |
| 4,551,723 | 11/1985 | Paterson | 340/963 |

FOREIGN PATENT DOCUMENTS

| | | | |
|---|---|---|---|
| 2133366A | 7/1984 | United Kingdom | 340/970 |
| 2139589A | 11/1984 | United Kingdom | 340/970 |

Primary Examiner—Joseph A. Orsino
Assistant Examiner—Brent A. Swarthart
Attorney, Agent, or Firm—Mason, Kolehmainen, Rathburn and Wyss

[57] ABSTRACT

A warning system for rotary wing aircraft that monitors the altitude above ground of the aircraft and issues a warning when there is insufficient terrain clearance. The warning criteria are optimized for rotary wing aircraft and are altered as a function of landing gear position and airspeed. Two distinct warnings are given. One indicates insufficient terrain clearance and the other warns the pilot if he attempts to land with the landing gear up. Logic circuitry is provided to modify the criteria necessary to generate a warning, and to inhibit certain warnings, as required by the mode of operation of the aircraft.

23 Claims, 2 Drawing Sheets

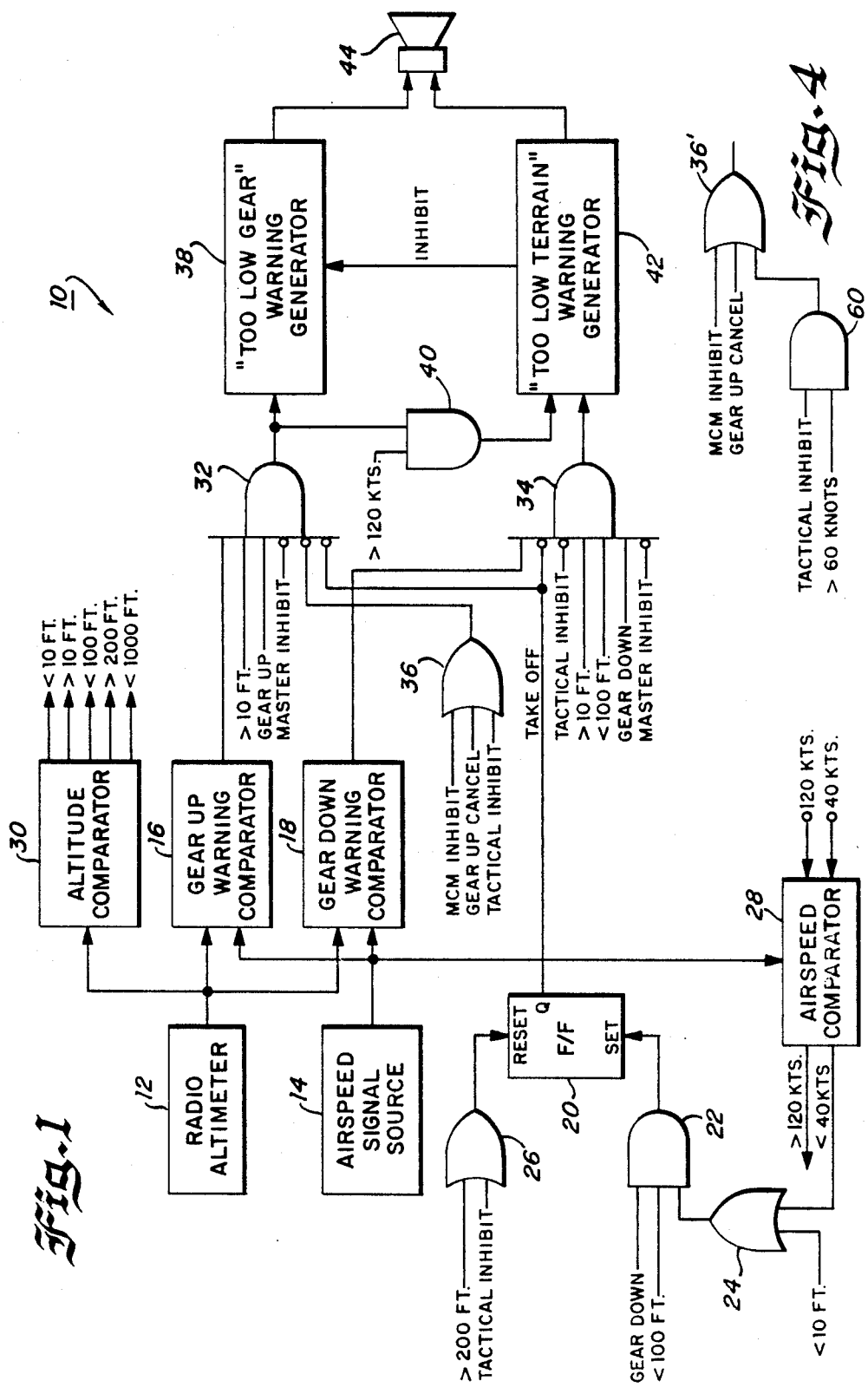

WARNING SYSTEM FOR TACTICAL ROTARY WING AIRCRAFT

CROSS-REFERENCE TO RELATED APPLICATION

This application is a continuation-in-part application of patent application Ser. No. 503,216, filed on Jun. 10, 1983, now abandoned.

BACKGROUND OF THE INVENTION

1. Field of the Invention

This invention relates generally to ground proximity warning systems, and more particularly to a ground proximity warning system for providing the pilot of a rotary wing aircraft with a warning in the event of insufficient terrain clearance, or if a landing with the landing gear up is attempted.

2. Description of the Prior Art

Systems for providing the pilot of an aircraft with a warning in the event of insufficient terrain clearance or if a gear up landing is attempted are known. Examples of such systems are disclosed in U.S. Pat. Nos. 3,934,221, 3,934,222, 3,944,968 and 4,030,065 assigned to the assignee of the present invention.

While these systems do provide warnings in the event of insufficient terrain clearance, these systems are designed primarily for use with transport aircraft, and are not readily applicable to rotary wing aircraft whose flight and operational characteristics are substantially different than those of transport aircraft.

SUMMARY OF THE INVENTION

Therefore, it is an object of the present invention to provide a warning system that overcomes many of the disadvantages of the prior art warning systems.

It is yet another object of the present invention to provide a warning to the pilot of a rotary wing aircraft in the event of insufficient terrain clearance.

It is yet another object of the present invention to provide a warning system that warns the pilot of a rotary wing aircraft if he attempts to land with the landing gear up.

It is yet another object of the present invention to provide a warning system for alerting the pilot of a rotary wing aircraft of an insufficient terrain clearance condition wherein the warning criteria are optimized for the performance and operational characteristics of rotary wing aircraft.

Therefore, in accordance with a preferred embodiment of the invention there is provided a system that monitors the altitude above ground and airspeed of the aircraft and generates a voice warning such as "TOO LOW TERRAIN" when the altitude above ground of the aircraft is insufficient for the airspeed at which the aircraft is flying. The criteria required to generate a warning are modified when the landing gear is up, and a second distinct warning such as "TOO LOW GEAR" is generated if the pilot attempts to land with the landing gear up.

DESCRIPTION OF THE DRAWING

These and other objects and advantages of the present invention will become readily apparent upon consideration of the following detailed description and attached drawing, wherein:

FIG. 1 is a logical block diagram of the portion of the system according to the invention that generates a warning in the event of insufficient terrain clearance;

FIG. 4 is a logic diagram of a modification to the block diagram illustrated in FIG. 1.

DETAILED DESCRIPTION OF THE PREFERRED EMBODIMENT

Figure 3:
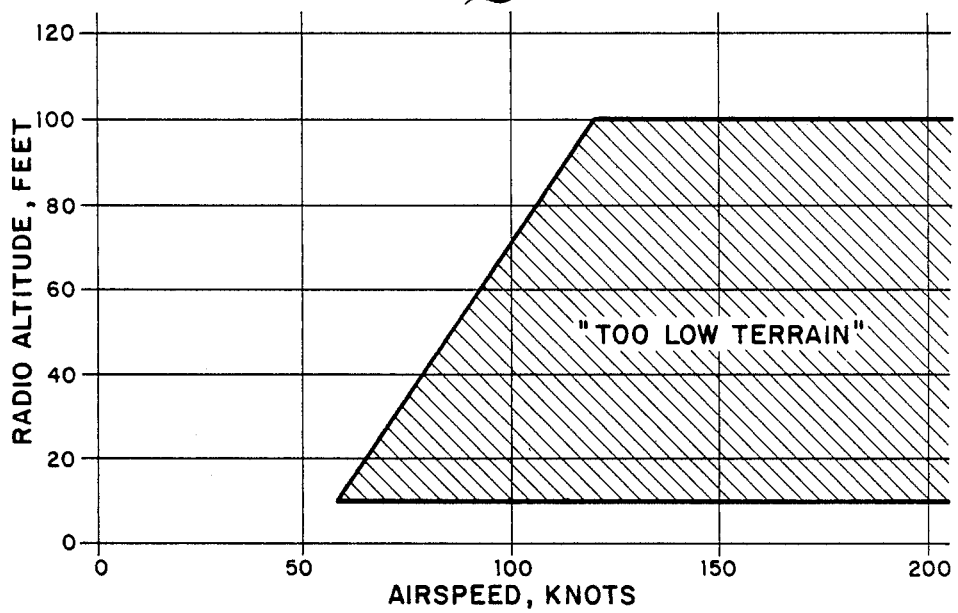
FIG. 3 is a graph illustrating the relationship between the airspeed of the aircraft and the altitude above ground of the aircraft required to generate a warning when the landing gear of the aircraft is down.

Referring now to the drawing, with particular attention to FIG. 1, there is illustrated an embodiment of the insufficient terrain clearance portion of the warning system according to the invention generally designated by the reference numeral 10. The system 10 according to the invention is illustrated in FIG. 1 in logical block diagram form as a series of gates, comparators, flip-flops and the like for purposes of illustration; however, it should be understood that the actual implementation of the system can be other than as shown in FIG. 1, with various digital and analog implementations being possible. The signals used by the warning system as described include radio altitude and airspeed along with a signal representative of the position of the landing gear, various discrete signals indicating the mode of operation of the aircraft, for example, tactical or non-tactical or mine counter measures (MCM), and various validity signals. Depending on the type of aircraft in which the warning system is installed, the signals shown in FIG. 1 can be obtained from individual instruments such as a radio altimeter 12, an airspeed signal source 14, such as, for example, an air data computer or an airspeed indicator, and various discrete elements such as a switch indicating the position of the landing gear, a tactical mission switch and a mine counter measures (MCM) switch. The tactical mission switch may be a separate switch activated by the pilot when he begins a tactical phase of flight, or it may be part of another switch, such as for example, a weapons arming switch. In the latter case, the system will automatically be placed in a tactical mode of operation whenever the weapons are armed. Alternatively, these signals may be obtained from a digital data bus in certain newer aircraft.

As previously discussed, the warning system according to the invention provides two different insufficient terrain clearance warnings according to two different warning criteria depending upon whether the landing gear of the aircraft is up or down. In the illustrated embodiment, the warning criteria for the gear up configuration are defined by a gear up warning comparator 16, while the criteria for generating the warning in a gear down configuration are defined by a gear down comparator 18. Both of the comparators 16 and 18 receive signals representative of the altitude above ground of the aircraft from the radio altimeter 12 and a signal representative of the airspeed of the aircraft from the airspeed signal source 14, and generate a warning initiation signal when the relationship between altitude above ground and airspeed is such that insufficient terrain clearance exists.

In order to avoid nuisance warnings, the system according to the invention is disabled during take-off. The disabling function is accomplished by a take-off flip-flop 20 that is set during take-off and reset during other phases of flight. The flip-flop 20 is set by an AND gate 22 when the landing gear is down, and the aircraft is below 100 feet of radio altitude, and if either the speed of the aircraft is below 40 knots or the aircraft is below 10 feet as is indicated by signals applied to an OR gate 24. The flip-flop 20 is reset by an OR gate 26 once the altitude above ground of the aircraft exceeds 200 feet, or the tactical inhibit signal indicating a tactical mission is applied to the gate 26. The various signals representative of various airspeeds and altitudes are provided by an airspeed comparator 28 and an altitude comparator 30. The airspeed comparator 28 receives signals from the airspeed signal source 14, and compares the airspeed signal with a reference signal representative of a predetermined airspeed, such as, for example, 40 knots, and provides a signal to the gate 24 whenever the airspeed is greater than 40 knots. Similarly, the altitude comparator 30 compares the altitude signals received from the radio altimeter 12 with various internally (or externally) generated reference signals representative of various altitudes, and provides various output signals representative of whether the altitude is above or below the various reference altitudes. For example, the altitude comparator 30 provides output signals representative of when the aircraft is below 10 feet, above 10 feet, below 100 feet and above 200 feet of radio altitude to various gates in the logic circuitry.

The system is inhibited by the master inhibit signal which inhibits a pair of gates 32 and 34 in the event of a faulty instrument. In addition, the gates 32 and 34 are inhibited during tactical operations by the tactical inhibit signal received, for example, from a tactical switch or a weapons arming switch (both not shown). The gates 32 and 34 are also inhibited when the aircraft is below 10 feet of radio altitude by the absence of the greater than 10 foot enabling signal. The gate 32 is enabled by a gear up signal when the aircraft landing gear is up in order to put the system under the control of the gear up comparator 16. The AND gate 34 is enabled by the gear down signal to place the system under the control of the gear down warning comparator 18 when the gear is down. In addition, the gate 32 is inhibited by an OR gate 36 under various flight conditions, including mine counter measures and tactical maneuvers, and if the pilot desires to cancel the gear up warning. The inhibiting function is provided by the mine counter measures (MCM) inhibit signal, the gear up cancel signal and the tactical inhibit signal.

When the aircraft is flying with its gear up and it is not in a take-off mode, and the other enabling conditions have been met, the AND gate 32 is under the control of the gear up warning comparator 16 which generates the warning initiation signal and applies it via the gate 32 to a first voice generator 38 and an AND gate 40 whenever the criteria indicating insufficient terrain clearance are exceeded. As long as the airspeed of the aircraft is below a predetermined airspeed, for example, 120 knots, the AND gate 40 is inhibited, thus preventing the warning initiation signal from being applied to a second warning generator 42. The first warning generator 38 is responsive to the warning initiation signal received from the AND gate 32 and generates a voice signal, such as, for example, "TOO LOW GEAR", and applies it to a transducer 44 which may be a loudspeaker, an earphone or the like to provide a voice warning to the pilot. Although FIG. 1 shows the signal from the generator 38 being applied directly to the transducer 44, the signal may also be applied indirectly, for example, via the aircraft intercom system.

When the airspeed of the aircraft exceeds a predetermined airspeed, such as, for example, 120 knots, indicating that the aircraft is in a cruise rather than in a landing mode of operation, the AND gate 40 is enabled by the greater than 120 knot signal. This permits the warning initiation signal from the AND gate 32 to be applied to the TOO LOW TERRAIN warning generator 42 to cause the "TOO LOW TERRAIN" warning to be generated and applied to the transducer 44. The generator 42 also inhibits the generator 38 when the "TOO LOW TERRAIN" warning is being generated to avoid confusing the pilot. Thus, when the speed of the aircraft is below 120 knots, indicative of a landing, any warning generated will be "TOO LOW GEAR". At an airspeed above 120 knots, which is indicative of a cruise mode of operation, any warning generated will be "TOO LOW TERRAIN".

When the landing gear is down, the AND gate 32 is inhibited, and the AND gate 34 is enabled to thereby place the TOO LOW TERRAIN warning generator 42 under the control of the gear down warning comparator 18 via the AND gate 34. Consequently, the warning criteria will be determined by the gear down warning comparator 18, and any warning generated will be "TOO LOW TERRAIN".

In the illustrated embodiment, the gear up warning comparator 16 and the gear down warning comparator 18 have been shown as two separate comparators; however, both functions can be implemented in a signal comparator whose warning criteria are modified depending on whether the gear is up or down. Similarly, the TOO LOW GEAR warning generator 38 and the TOO LOW TERRAIN warning generator 42 are shown as two separate warning generators, but a single warning generator capable of generating two distinct warnings can also be used.

Figure 2:
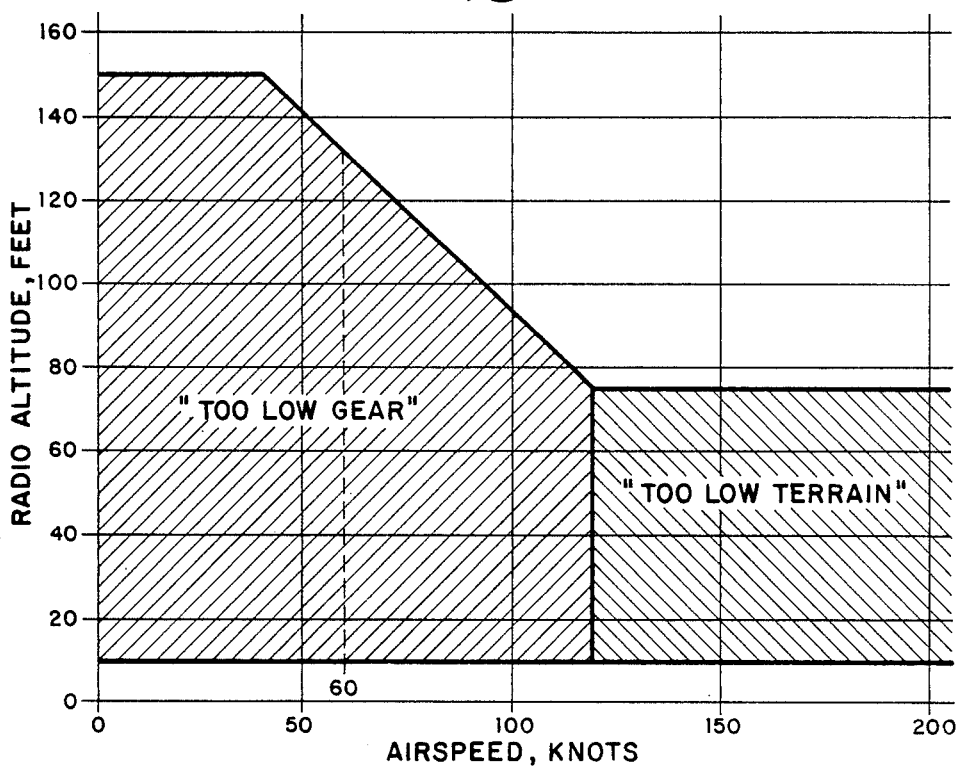
FIG. 2 is a graph illustrating the relationship between the airspeed of the aircraft and the altitude above ground required to generate a warning when the landing gear is up.

The relationships between radio altitude and airspeed required to generate a warning are illustrated by the shaded areas of FIG. 2. Below an airspeed of approximately 120 knots, the "TOO LOW GEAR" warning is generated, and above approximately 120 knots airspeed the "TOO LOW TERRAIN" warning is generated. The dashed vertical line at 60 knots is not pertinent to the embodiment illustrated in FIG. 1, but will be discussed in conjunction with FIG. 4. Below approximately 40 knots of airspeed, the "TOO LOW GEAR" warning is generated when the altitude above ground of the aircraft drops below approximately 150 feet. The altitude required to generate the warning drops linearly with airspeed above approximately 40 knots until an airspeed of approximately 120 knots is reached, at which point the warning is generated at an altitude of approximately 75 feet above the ground. The reason for the particular shape of the curve is to maximize the warning time when the pilot is actually landing, and to minimize nuisance warnings when low level maneuvers are being performed, since such maneuvers are generally performed at airspeeds in excess of approximately 40 knots. Above an airspeed of approximately 120 knots the "TOO LOW TERRAIN" warning is generated whenever the radio altitude drops below approximately 75 feet regardless of airspeed, provided that the airspeed exceeds approximately 120 knots.

The relationship between radio altitude and airspeed required to generate a warning in the gear down mode of operation is shown by the shaded portion of the graph of FIG. 3. Because the gear is down already, no "TOO LOW GEAR" warning is generated, and the only warning generated is "TOO LOW TERRAIN". Above an airspeed of approximately 120 knots, dropping below a radio altitude of approximately 100 feet will cause the warning to be generated. This altitude is somewhat higher than the altitude required to generate the warning in the gear up case, because helicopters generally have their landing gear down when performing low level maneuvers. Below approximately 120 knots airspeed, the altitude at which the warning is generated decreases linearly until the warning altitude is reduced to 10 feet at an airspeed of 58 knots. Below an airspeed of 58 knots, no warning is given in order to permit nuisance warning free, low speed, low level maneuvering. Also, the warnings are inhibited below 10 feet of radio altitude for both the gear up and the gear down modes of operation in order to avoid nuisance warnings caused by erratic radio altitude signals at low altitudes.

In the embodiment illustrated in FIG. 1, the "TOO LOW GEAR" warning is inhibited by the tactical inhibit signal whenever the aircraft is in a tactical mode of operation in order to avoid nuisance warnings. However, in some instances, it is desirable to provide a system that generates a warning even in the tactical mode of operation. Thus, rather than completely inhibiting the "TOO LOW GEAR" warning in the tactical mode, the warning is only partially inhibited. This is accomplished by utilizing an OR gate 36' and an AND gate 50 (FIG. 4) in place of the OR gate 36 of FIG. 1. The function of the OR gate 36' is similar to that of the OR gate 36 in that the OR gate 36' serves to inhibit the "TOO LOW GEAR" warning during mine countermeasures, and when it is desired to cancel the warning even though the gear is up. However, the gate 36' is not inhibited by the tactical inhibit alone, but rather, by the AND gate 52 which requires both the presence of the tactical inhibit and that the speed of the aircraft be above a predetermined speed, for example, 60 knots. Thus, the "TOO LOW GEAR" warning is inhibited only when the speed of the aircraft is above the predetermined speed, for example, 60 knots, as is illustrated by the vertical dashed line at 60 knots in FIG. 2. Consequently, a warning will still be generated if the aircraft should drop below an altitude of approximately 130 feet at a speed of approximately 60 knots. In addition, the warning will be given in the "TOO LOW GEAR" area to the left of the vertical dashed line at 60 knots in FIG. 2, and be inhibited at higher speeds. The greater than 60 knot signal applied to the AND gate 60 may be obtained as another input (not shown) of the altitude comparator 30, or from another source. Also, the speed above which the "TOO LOW GEAR" warning is inhibited may be varied somewhat to suit particular aircraft and operating conditions.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A ground proximity warning system for alerting the pilot of a rotary wing aircraft of insufficient terrain clearance, comprising:

means for receiving a signal representative of the airspeed of the aircraft;

means for receiving a signal representative of the altitude above ground of the aircraft; and means responsive to said airspeed signal and said altitude above ground signal receiving means for generating a warning if the altitude above ground of the aircraft is below a predetermined value determined for the airspeed at which the aircraft is flying, wherein said warning generating means includes means for providing said warning if said aircraft descends below a first altitude above ground at a first airspeed, and for providing said warning if said aircraft descends below a second lower altitude above ground at a higher airspeed.

2. A warning system as recited in claim 1 wherein said warning generating means includes means for generating a first warning if the aircraft is flying below a predetermined airspeed, and a second distinct warning if the aircraft is flying above said predetermined airspeed.

3. A ground proximity warning system as recited in claim 1 further including means responsive to a signal representative of a tactical phase of flight for preventing the generation of said warning when the aircraft is in a tactical phase of flight.

4. A ground proximity warning system as recited in claim 1 further including means responsive to a signal representative of a tactical phase of flight for preventing the generation of said warning when the aircraft is in a tactical phase of flight and the airspeed of the aircraft is above a predetermined airspeed.

5. A ground proximity warning system as recited in claim 4 wherein said predetermined airspeed is approximately 60 knots.

6. A ground proximity warning system as recited in claim 5 wherein said warning is provided at an altitude of approximately 130 feet at an airspeed of approximately 60 knots and at an altitude of approximately 150 feet at airspeeds of approximately 40 knots and below.

7. A ground proximity warning system as recited in claim 2 further including means responsive to a signal representative of a tactical phase of flight for preventing the generation of said first and second warnings when the aircraft is in a tactical phase of flight.

8. A ground proximity warning system as recited in claim 2 further including means responsive to a signal representative of a tactical phase of flight for preventing the generation of said second warning and for preventing the generation of said first warning when the aircraft is in a tactical phase of flight and the airspeed of the aircraft is above a predetermined airspeed.

9. A ground proximity warning system as recited in claim 8 wherein said predetermined airspeed is approximately 60 knots.

10. A ground proximity warning system as recited in claim 8 wherein said warning is provided at an altitude of approximately 130 feet at an airspeed of approximately 60 knots and at an altitude of approximately 150 feet at airspeeds of approximately 40 knots and below.

11. A warning system as recited in claim 1 wherein said warning generating means includes means for generating said warning if said aircraft descends below an altitude of approximately 150 feet above the ground if the airspeed of the aircraft is below approximately 40 knots, and for generating said warning if said aircraft descends below an altitude of approximately 75 feet above the ground when the airspeed of the aircraft is greater than approximately 120 knots.

12. A warning system as recited in claim 11 wherein the altitude required to generate a warning decreases linearly between an airspeed of approximately 40 knots and an airspeed of approximately 120 knots.

13. A warning system as recited in claim 12 wherein said system includes means for preventing the generation of a warning at altitudes below approximately 10 feet above the ground.

14. A warning system as recited in claim 12 wherein said warning generating means includes means for generating a first warning when the aircraft is flying at airspeeds below approximately 120 knots and for generating a second distinct warning when the aircraft is flying at airspeeds above approximately 120 knots.

15. A warning system is recited in claim 1 further including means for preventing the generation of a warning when the aircraft is taking off.

16. A warning system as recited in claim 1 wherein said aircraft has landing gear that is movable between an up position and a down position, and wherein said system includes means for receiving a signal representative of the position of the landing gear of the aircraft, and wherein said warning generating means is responsive to the landing gear position signal providing means for altering the altitudes above ground below which the warning is generated so that the altitude above ground below which the warning is generated increases with an increase in airspeed when the landing gear is down.

17. A ground proximity warning system for alerting the pilot of a rotary wing aircraft of insufficient terrain clearance, comprising:
means for receiving a signal representative of the airspeed of the aircraft;
means for receiving a signal representative of the altitude above ground of the aircraft; and
means responsive to said airspeed and altitude signal receiving means for generating a warning if the altitude above ground is below a predetermined value determined for the airspeed at which the aircraft is flying, said warning generating means including means for providing a warning if the altitude above ground of the aircraft drops below approximately 100 feet and the airspeed of the aircraft is in excess of approximately 120 knots, wherein said warning generating means includes means for decreasing the altitude above ground below which the warning is generated as the airspeed of the aircraft decreases.

18. A warning system as recited in claim 17 wherein said warning generating means includes means for generating said warning at an altitude of approximately 10 feet above the ground when the airspeed of the aircraft is approximately 58 knots.

19. A warning system as recited in claim 18 wherein said generating means includes means for linearly increasing the altitude above ground below which the warning is generated as a function of increasing airspeed between an airspeed of approximately 58 knots and an airspeed of approximately 120 knots.

20. A ground proximity warning system for alerting the pilot of a rotary wing aircraft having a landing gear that is movable between an up position and a down position of insufficient terrain clearance, comprising:
means for receiving a signal representative of the airspeed of the aircraft;
means for receiving a signal representative of the altitude above ground of the aircraft;
means for receiving a signal representative of the position of the landing gear of the aircraft; and
means responsive to said airspeed signal receiving means, said altitude above ground signal receiving means and said landing gear position signal receiving means for generating a warning if the altitude of the aircraft is below a predetermined value for the airspeed at which the aircraft is flying which increases with increases in airspeed when the landing gear is down, wherein said warning generating means is operative to alter the altitude above ground below which a warning is generated such that it decreases with increases in airspeed when the landing gear is up.

21. A warning system as recited in claim 20 wherein said warning generating means includes means for generating said warning if the aircraft descends below an altitude of approximately 150 feet above the ground if the airspeed of the aircraft is below approximately 40 knots and for generating the warning if the aircraft descends below an altitude of approximately 75 feet above the ground when the airspeed of the aircraft is greater than approximately 120 knots, and the landing gear is up.

22. A warning as recited in claim 21 wherein said warning generating means includes means for generating said warning at an altitude of approximately 10 feet above the ground when the airspeed of the aircraft is approximately 58 knots and for linearly increasing the altitude above ground below which the warning is generated as a function of increasing airspeed between an airspeed of approximately 58 knots and an airspeed of approximately 120 knots.

23. A ground proximity warning system for alerting the pilot of a rotary wing aircraft having a landing gear that is movable between an up position and a down position of insufficient terrain clearance, comprising:
means for receiving a signal representative of the airspeed of the aircraft;
means for receiving a signal representative of the altitude above ground of the aircraft;
means for receiving a signal representative of the position of the landing gear of the aircraft; and
means responsive to said airspeed signal receiving means, said altitude above ground signal receiving means and said landing gear position signal receiving means for generating a warning if the altitude of the aircraft is below a predetermined value determined for the airspeed at which the aircraft is flying wherein the altitude at which the warning is given decreases with increasing airspeed.

* * * * *